(12) United States Patent
Turnau, III et al.

(10) Patent No.: US 7,178,786 B2
(45) Date of Patent: Feb. 20, 2007

(54) STEM CONSTRUCTION FOR ROTATABLE VALVE BODY

(75) Inventors: William F. Turnau, III, Canton, MI (US); Steven J. Tokarz, Canton, MI (US); Jack E. Elder, Rochester, MI (US); Scott K. Wilson, Rochester Hills, MI (US)

(73) Assignee: Brass-Craft Manufacturing Company, Novi, MI (US)

( * ) Notice: Subject to any disclaimer, the term of this patent is extended or adjusted under 35 U.S.C. 154(b) by 155 days.

(21) Appl. No.: 10/958,308

(22) Filed: Oct. 5, 2004

(65) Prior Publication Data

US 2005/0109969 A1 May 26, 2005

Related U.S. Application Data

(60) Provisional application No. 60/524,195, filed on Nov. 21, 2003.

(51) Int. Cl.
*F16K 5/04* (2006.01)

(52) U.S. Cl. ....................................... 251/309

(58) Field of Classification Search ............... 251/304, 251/305, 309, 315.01
See application file for complete search history.

(56) References Cited

U.S. PATENT DOCUMENTS

| | | | | |
|---|---|---|---|---|
| 3,570,810 A | * | 3/1971 | Kawolics | 251/172 |
| 3,712,338 A | * | 1/1973 | Bucalo | 251/315.03 |
| 3,788,601 A | * | 1/1974 | Schmitt | 251/304 |
| 3,831,621 A | * | 8/1974 | Anthony et al. | 251/316 |
| 4,092,085 A | * | 5/1978 | McMaster-Christie | 251/313 |
| 4,445,529 A | * | 5/1984 | Lagarelli | 251/292 |
| 4,961,443 A | * | 10/1990 | Buccicone et al. | 251/292 |
| 5,046,528 A | * | 9/1991 | Manska | 251/304 |
| 5,076,540 A | * | 12/1991 | Murphy | 251/175 |
| 5,671,904 A | * | 9/1997 | Minutillo | 251/96 |
| 5,695,169 A | * | 12/1997 | Higgins et al. | 251/304 |
| 5,741,003 A | * | 4/1998 | Segien, Jr. | 251/95 |
| 5,924,676 A | * | 7/1999 | Cook et al. | 251/304 |
| 6,016,830 A | * | 1/2000 | Niakan et al. | 251/288 |
| 6,076,554 A | * | 6/2000 | Jensen et al. | 251/285 |
| 6,666,227 B2 | * | 12/2003 | Erickson | 251/293 |

* cited by examiner

*Primary Examiner*—John Bastianelli
(74) *Attorney, Agent, or Firm*—Edgar A. Zarins; Lloyd D. Doigan

(57) ABSTRACT

A valve stem construction for a manipulable valve member used to control fluid flow through a valve. The valve stem extends externally of the valve housing for engagement by a valve handle used to manipulate the valve member between open and closed positions. The valve is formed with a plurality of circumferentially spaced concave splines extending longitudinally on the outer surface of the valve stem. The splines are spaced so as to maximize transmission of rotational torque while minimizing flexure and twisting of the valve stem. The spacing and configuration of the individual splines also ensure a strong mating fit with the valve handle.

18 Claims, 2 Drawing Sheets

STEM CONSTRUCTION FOR ROTATABLE VALVE BODY

RELATED APPLICATIONS

This application claims priority from U.S. Provisional Application No. 60/524,195 filed on Nov. 21, 2003.

BACKGROUND OF THE INVENTION

I. Field of the Invention

This invention relates to rotatable valves used to control fluid flow through a device and, in particular, to a unique stem configuration associated with the rotatable valve which creates a rigid connection between the valve handle and valve member.

II. Description of the Prior Art

Rotatable valves are traditionally used to control the flow of fluids between a fluid source and a fluid device. Such valves may simply provide for turning the flow on or off or for controlling the flow rate according to the degree of rotation. Prior known valves have included ball valves and barrel valves. The conventional valves will include a rotatable valving member disposed in a valve chamber having a fluid inlet and a fluid outlet. Similarly, the valve member will include an inlet and outlet which can be aligned with the chamber inlet and outlet to block or permit flow through the valve. The inlets and outlets can be axially aligned or may be disposed at an angle to each other.

Manipulation of the valve member is facilitated by a valve handle which is connected to the valve member. Specifically, the handle will be connected to a valve stem which extends out of the valve chamber. The handle can be attached to the stem in many ways but must be capable of transmitting rotational torque through the stem to the valve member. In the past, simple fasteners have been used to connect the handle to the valve stem. Such a connection is suitable in applications where a large diameter stem member was used or the external member was metallic. Additionally, in valve assemblies which require increased rotational torque to rotate the valve member, simple connections can fail leaving the user without the ability to manipulate the valve. Furthermore, in prior known valve members which require substantial rotational torque, the valve stem may flex, twist or strip all together. This is particularly a concern in valve assemblies which are not frequently actuated and the member tends to "stick" in the chamber.

SUMMARY OF THE INVENTION

The present invention overcomes the disadvantages of the prior art by providing a valve stem construction for a rotatable valve body which maximizes the rotational torque that can be transmitted by the valve handle to the stem and valve member.

Fluid valves are being constructed of increasingly complex materials in order to provide the necessary sealing capabilities as well as withstand the mechanical forces applied to such valves. In order to prevent fluid leakage past the valving member, it is desirable to mold the valve member of a softer material which seals within the valve chamber. In order to transmit rotational movement, the valve stem is molded of a stronger material. The valve stem and barrel may be banded together through a dual molding process or by other known methods to allow the valve stem to transmit rotation applied through the handle to the valve body.

The valve stem of the present invention is provided with a unique construction to eliminate flexure or twisting of the stem while transmitting the rotational torque applied through the handle. The stem has a substantially cylindrical configuration configured to mate with the handle. The stem includes a plurality of concave splines formed longitudinally along the stem and spaced on the periphery of the stem. The splines formed on the stem are designed to mate with similarly configured splines on the valve handle such that as the stem is matingly received within the handle, the circumferentially spaced splines engage. In this manner, rotational torque applied to the handle by the user is transmitted through the splines to the valve stem for rotational operation of the valve.

The splines are configured and spaced on the periphery of the stem to provide ease of mating engagement with the handle and to minimize twisting, flexure and breakage of the stem even under increased rotational torques. In a preferred embodiment, three concave splines are formed on the stem. Rather than be equally spaced on the circumference of the stem, two of the three splines are formed closer together creating a larger gap with the third spline thereby providing orientation and alignment with the inlet and outlet. The individual spline grooves are formed with an expended chamfer at their outer end to facilitate insertion of the handle spline. An interior end of each of the splines tapers to a narrower diameter in order to create an interference fit with the handle spline. The stem also includes an axial bore for receiving a fastener used to secure the valve handle to the stem.

Other objects, features and advantages of the present invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
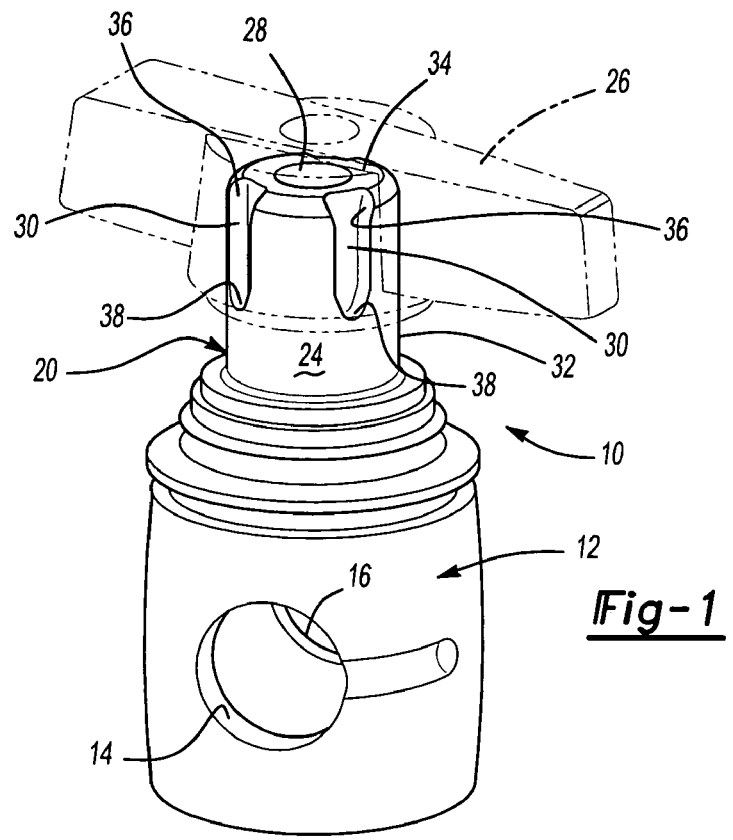
FIG. 1 is a side perspective view of a valve member embodying the valve stem construction of the present invention.
Figure 2:
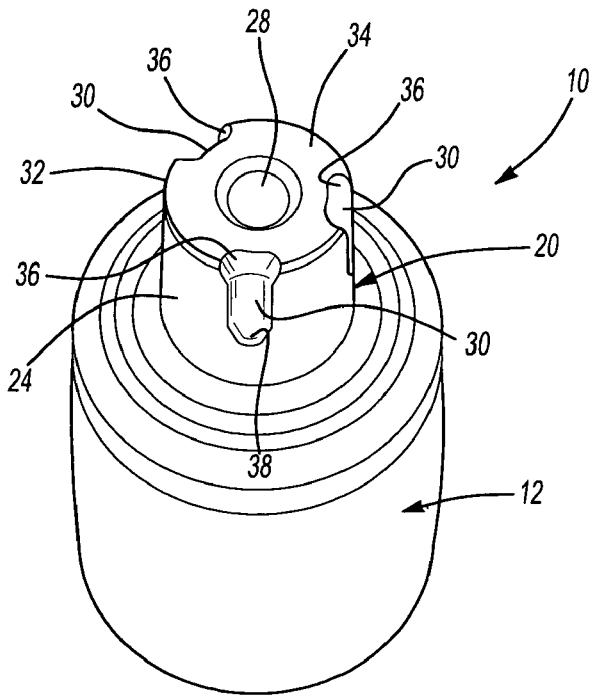
FIG. 2 is an end perspective view of the valve member.

Referring first to FIGS. 1 and 2, there is shown a valve member 10 adapted to selectively control fluid flow through a valve (not shown). The valve member 10 disclosed herein is a barrel-type valve member 10 having a barrel shaped valve body 12 through which fluid flows. The valve body 12 will include a fluid inlet 14 and a fluid outlet 16 which are adapted to be aligned with inlets and outlets of the valve to control flow. Although the present invention will be described in conjunction with a barrel-type valve member, alternative configurations will also be applicable to the present invention.

Extending from the valve body 12 is a stem construction 20 used to manipulate the valve member 10 within the valve. In one embodiment of the present invention, the stem 20 and valve body 12 may be molded as a single component. In a preferred embodiment, the valve member 10 is molded in two operations allowing the valve body 12 to be molded of a softer material more conducive to sealing within the valve and the stem construction is molded of a more rigid material in order to withstand the rotational torque associated with manipulation of the valve member 10. The stem 20 could be simply attached to the valve body 12 or the components can be sequentially molded in a dual molding process.

Figure 3:
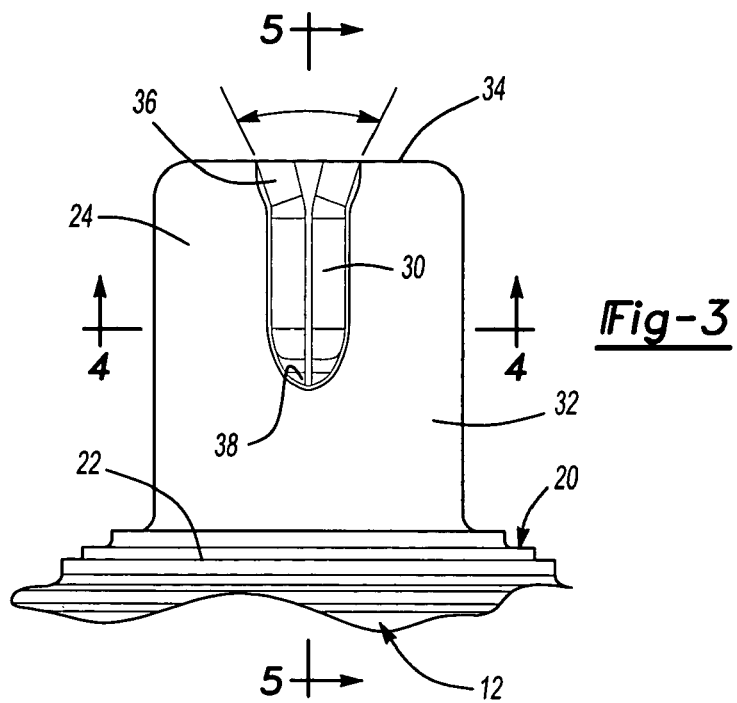
FIG. 3 is an enlarged view of the valve stem.
Figure 4:
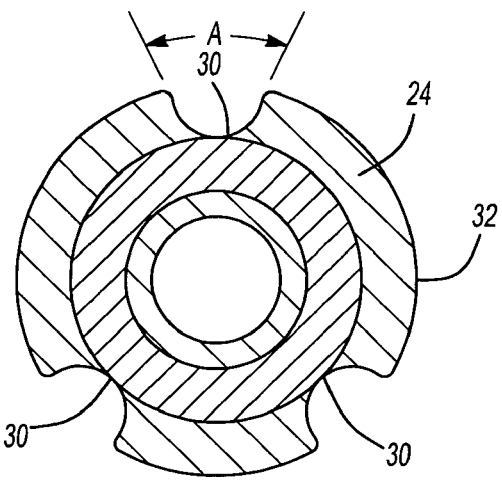
FIG. 4 is a lateral cross-sectional view of the valve taken along lines 4—4 in FIG. 3.
Figure 5:
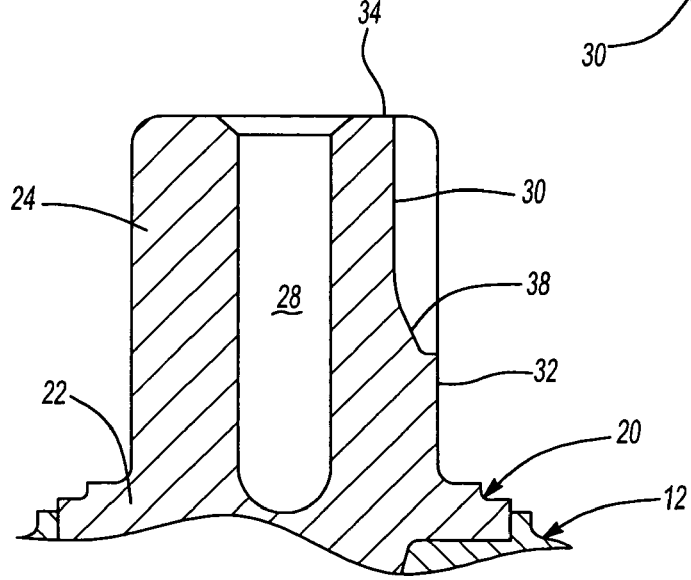
FIG. 5 is a longitudinal cross-sectional view of the valve stem taken along lines 5—5 in FIG. 3.

Referring now also to FIGS. 3 through 5, the stem construction 20 of the preferred embodiment includes a base portion 22 which engages the valve body 12 and a stem portion 24 extending from the base portion 22. The stem portion 24 has a substantially cylindrical configuration to facilitate mating with a valve handle 26. The valve handle 26 being used to manipulate the valve member 10 within the valve. The stem portion 24 includes an axial bore 28 adapted to receive a fastener used to secure the handle 26 to the valve member 10.

In accordance with the present invention, the stem construction 20 has a unique configuration which facilitates transmission of rotational torque from the valve handle 26 to the valve member 10 while minimizing flexure and twisting of the stem portion 24. A plurality of concave splines 30 is formed in the outer surface 32 of the stem portion 24. The splines 30 are circumferentially spaced on the stem portion 24 and extend longitudinally along at least part of the stem portion 24. The splines 30 are open at an upper end 34 of the stem portion 24 to allow insertion of similarly configured keys on the valve handle 26. Of course, the arrangement could be reversed such that the splines are formed within the valve handle 26 and the stem portion 24 is formed with mating keys. Preferably, the splines 30 include a chamfer 36 creating an opening larger than the diameter of the splines 30 to facilitate insertion within the handle 26. A lower end of the splines 30 tapers to a reduced diameter 38 to create an interference fit with the handle 26. The splines 30 are formed with a concave angle A which creates a spline wall capable of transmitting rotational torque while preventing "stripping" of the splines 30.

The splines 30 are arranged on the outer surface 32 of the stem portion 24 so as to maximize the transmission of torque to the stem 20 and the valve member 10 without twisting or breakage. In some cases, these types of valves can remain unused for several years. Such idleness can cause the valve member 10 to stick requiring increased torque to rotate the valve member 10. The stem portion 24 may twist or break under such torque. The preferred embodiment of the invention includes three splines 30 circumferentially arranged on the stem portion 24. Rather than being equally spaced on the outer surface 32, two of the splines 30 are closer to each other than the third spline 30. By way of example, first and second splines 30 are arranged only 90° apart and the third spline 30 is spaced 135° from the first and second splines 30. Alternative non-symmetrical arrangements of the splines 30 may be employed although it has been determined that the foregoing arrangement provides the most efficient combination for transmitting the rotational torque. The preferred orientation also provides alignment of the valve handle 26 with the inlet and outlet of the valve 10. The mating profile of the stem portion 24 also creates an orientation feature for positioning the handle 26 on the stem 20.

The foregoing detailed description has been given for clearness of understanding only and no unnecessary limitations should be understood therefrom as some modifications will be obvious from the scope and spirit of the appended claims.

What is claimed is:

1. A valve stem for a valve body adapted to control fluid flow through a valve, the valve body adapted to be manipulated by a valve handle matingly engaging said valve stem, said valve stem comprising:
   a base portion engaging the valve body and;
   a substantially cylindrical stem portion extending from said base portion, said stem portion including at least three circumferentially spaced splines extending longitudinally on said stem portion, spacing between one pair of successive splines being less than the spacing between other pairs of successive splines, said splines adapted to engage the valve handle such that rotation of the valve handle is transmitted to said valve stem for rotation of the valve body.

2. The valve stem as defined in claim 1 wherein first and second successive splines are spaced 90 degrees apart on said cylindrical stem portion.

3. The valve stem as defined in claim 2 wherein each of said first and said second splines are spaced 135 degrees from a third spline on said stem portion.

4. The valve stem as defined in claim 1 wherein said at least three splines are open at an upper end of said stem portion and extend partially the length of said stem portion.

5. The valve stem as defined in claim 4 wherein said open end of said at least three splines includes a chamfer having a diameter greater than a diameter of said at least three splines.

6. The valve stem as defined in claim 5 wherein a lower end of said at least three splines is tapered to a reduced diameter.

7. The valve stem as defined in claim 4 wherein said stem portion includes a partial axial bore adapted to receive a fastener for securing the valve handle to said valve stem.

8. A valve stem for a valve body adapted to control fluid flow through a valve, the valve body adapted to be manipulated by a valve handle matingly engaging said valve stem, said valve stem comprising:
   a base portion engaging the valve body; and
   a substantially cylindrical stem portion extending from said base portion, said stem portion including three splines circumferentially spaced and extending longitudinally on said stem portion, spacing between one pair of successive splines being less than the spacing between other pairs of successive splines, said three splines adapted to engage the valve handle such that rotation of the valve handle is transmitted to said valve stem for rotation of the valve body.

9. The valve stem as defined in claim 8 wherein first and second splines are spaced closer to each other than to other splines on said stem portion.

10. The valve stem as defined in claim 9 wherein said first and second splines are spaced 90 degrees apart on said cylindrical portion.

11. The valve stem as defined in claim 10 wherein each of said first and second splines are spaced 135 degrees from a third spline on said stem portion.

12. The valve stem as defined in claim 11 wherein said splines are open at an upper end of said stem portion and extend partially the length of said stem portion.

13. The valve stem as defined in claim 12 wherein said open end of said splines includes a chamfer having a diameter greater than the diameter of said splines.

14. The valve stem as defined in claim 13 wherein a lower end of said splines is tapered to a reduced diameter.

15. A valve stem for a valve member adapted to control fluid flow through a valve, the valve member adapted be manipulated by a valve handle matingly engaging said valve stem, said valve stem comprising:
- a base portion engaging the valve member; and
- a substantially cylindrical stem portion extending from said base portion, said stem portion including three splines circumferentially spaced and extending longitudinally on said stem portion, said three splines adapted to engage the valve handle such that rotation of the valve handle is transmitted to said valve stem for rotation of the valve member;

wherein first and second successive splines are spaced 90 degrees apart on said stem portion and each of said first and second splines are spaced 135 degrees from a third successive spline on said stem portion.

16. The valve stem as defined in claim 15 wherein said splines are open at an upper end of said stem portion and extend partially the length of said stem portion.

17. The valve stem as defined in claim 16 wherein said open end of said splines includes a chamfer having a diameter grater than the diameter of said splines.

18. The valve stem as defined in claim 17 wherein a lower end of said splines is tapered to a reduced diameter.

* * * * *